(12) United States Patent
Nazemi

(10) Patent No.: US 10,018,504 B2
(45) Date of Patent: Jul. 10, 2018

(54) GAIN NORMALIZATION

(71) Applicant: Sensors Unlimited, Inc., Princeton, NJ (US)

(72) Inventor: Jonathan Nazemi, Doylestown, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 291 days.

(21) Appl. No.: 14/939,420

(22) Filed: Nov. 12, 2015

(65) Prior Publication Data

US 2017/0138788 A1     May 18, 2017

(51) Int. Cl.

| | | |
|---|---|---|
| *G01J 1/44* | (2006.01) | |
| *G01J 1/42* | (2006.01) | |
| *G01J 5/00* | (2006.01) | |
| *H05B 1/02* | (2006.01) | |
| *H04N 5/33* | (2006.01) | |
| *H04N 5/374* | (2011.01) | |
| *G01J 5/16* | (2006.01) | |
| *G01J 5/20* | (2006.01) | |
| *G01J 5/10* | (2006.01) | |

(52) U.S. Cl.
CPC ............. *G01J 1/44* (2013.01); *G01J 1/4228* (2013.01); *G01J 5/16* (2013.01); *G01J 5/20* (2013.01); *G01J 2001/444* (2013.01); *G01J 2005/0048* (2013.01); *G01J 2005/106* (2013.01)

(58) Field of Classification Search
CPC ......... H04N 5/3655; H04N 5/378; H04N 5/33
USPC ....................................... 348/164
See application file for complete search history.

(56) References Cited

U.S. PATENT DOCUMENTS

| | | | |
|---|---|---|---|
| 4,587,563 A | 5/1986 | Bendell et al. | |
| 6,504,155 B1 | 1/2003 | Ookawa | |
| 6,891,160 B2 | 5/2005 | Kaufman et al. | |
| 7,235,785 B2 | 6/2007 | Hornback et al. | |
| 7,679,048 B1 | 3/2010 | Aziz et al. | |
| 2002/0166967 A1* | 11/2002 | Kaufman | G01N 23/225 250/311 |

(Continued)

OTHER PUBLICATIONS

Extended European Search Report dated May 24, 2017, of the European Patent Office, in corresponding European Patent Application No. 16198327.5.

*Primary Examiner* — Hee-Yong Kim
(74) *Attorney, Agent, or Firm* — Locke Lord LLP; Scott D. Wofsy; Joshua L. Jones

(57) ABSTRACT

A method of normalizing FPA system gain for varying temperature includes determining an FPA temperature and calculating an FPA system gain as a function of the FPA temperature, system gain for the FPA at a reference temperature, and empirically derived coefficients. The method also includes applying the FPA system gain at the FPA temperature to condition output of the FPA to produce temperature independent image data. An imaging system includes a focal plane array (FPA). A temperature sensor is operatively connected to measure temperature of the FPA. A module is operatively connected to the FPA and temperature sensor to calculate FPA system gain for the FPA as described above, and to apply the FPA system gain to condition output of the FPA to produce temperature independent image data. There need be no temperature control device, such as a thermoelectric cooling device, connected for temperature control of the FPA.

13 Claims, 2 Drawing Sheets

(56) References Cited

U.S. PATENT DOCUMENTS

| | | |
|---|---|---|
| 2002/0179842 A1 | 12/2002 | Ookawa |
| 2003/0121905 A1* | 7/2003 | Nanno .................. G05B 11/32 |
| | | 219/494 |
| 2004/0253003 A1 | 12/2004 | Farmer et al. |
| 2005/0205785 A1 | 9/2005 | Hornback et al. |
| 2008/0179520 A1 | 7/2008 | Kauffman et al. |
| 2012/0050539 A1 | 3/2012 | Naimi et al. |
| 2014/0016844 A1 | 1/2014 | Afanasenko |
| 2014/0139643 A1 | 5/2014 | Hogasten et al. |
| 2014/0175591 A1 | 6/2014 | Tian et al. |
| 2015/0009337 A1* | 1/2015 | Minlong .................. H04N 5/33 |
| | | 348/166 |

* cited by examiner

GAIN NORMALIZATION

STATEMENT REGARDING FEDERALLY SPONSORED RESEARCH OR DEVELOPMENT

This invention was made with government support under contract number N00014-14-C-0061 awarded by the United States Navy, and contracts number W15P7T-06-D-E402/S3 and W15P7T-10-D-D413/R23G awarded through the Marine Corps Systems Command (MARCORSYSCOM). The government has certain rights in the invention.

BACKGROUND OF THE INVENTION

1. Field of the Invention

The present disclosure relates to imaging, and more particularly to focal plane arrays such as used in imaging systems.

2. Description of Related Art

A typical focal plane array (FPA) has a system gain that is not constant as a function of temperature. System gain is important in producing accurate image data, and since the temperature of an FPA varies, e.g., based on changes in the environment external to the imaging system as well as changes in temperature due to changes in operation within an imaging system, variation in temperature gain can present a challenge to creating accurate image data. A typical solution for this problem is to utilize thermoelectric cooling to control the temperature of the FPA. As long as the thermoelectric cooling maintains a constant, known temperature at the FPA, and as long as the correct system gain at that temperature is known, the FPA can be used to produce accurate image data.

Such conventional methods and systems have generally been considered satisfactory for their intended purpose. However, there is still a need in the art for improved imaging techniques. The present disclosure provides a solution for this need.

SUMMARY OF THE INVENTION

A method of normalizing FPA system gain for varying temperature includes determining an FPA temperature and calculating an FPA system gain as a function of the FPA temperature, system gain for the FPA at a reference temperature, and empirically derived coefficients. The method also includes applying the FPA system gain at the FPA temperature to condition output of the FPA to produce temperature independent image data.

Applying the FPA system gain can be performed without controlling the temperature of the FPA. The function of the FPA temperature, system gain for the FPA at the reference temperature, and empirically derived coefficients can incorporate approximating change in system gain at the FPA temperature compared to the system gain at the reference temperature. The reference temperature can be room temperature or any other suitable temperature.

Calculating the FPA system gain as a function of the FPA temperature, system gain for the FPA at a reference temperature, and empirically derived coefficients can be governed by $$Vgain(T)=[(p1+p3*Tref)*Vgainref+p2*(Tref-T)]/(p1+p3*T)$$

wherein Vgain is a variable control level which correlates to the FPA system gain, Vgainref is the value of the control level which sets the FPA system gain at the reference temperature (Tref), and p1, p2, and p3 are empirically derived coefficients.

An imaging system includes a focal plane array (FPA). A temperature sensor is operatively connected to measure temperature of the FPA. A module is operatively connected to the FPA and temperature sensor to calculate FPA system gain for the FPA as described above, and to apply the FPA system gain to condition output of the FPA to produce temperature independent image data.

There need be no temperature control device, such as a thermoelectric cooling device, connected for temperature control of the FPA. The FPA can include a buffered current mirror pixel architecture. It is also contemplated that the FPA can include an InGaAs material for infrared imaging.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
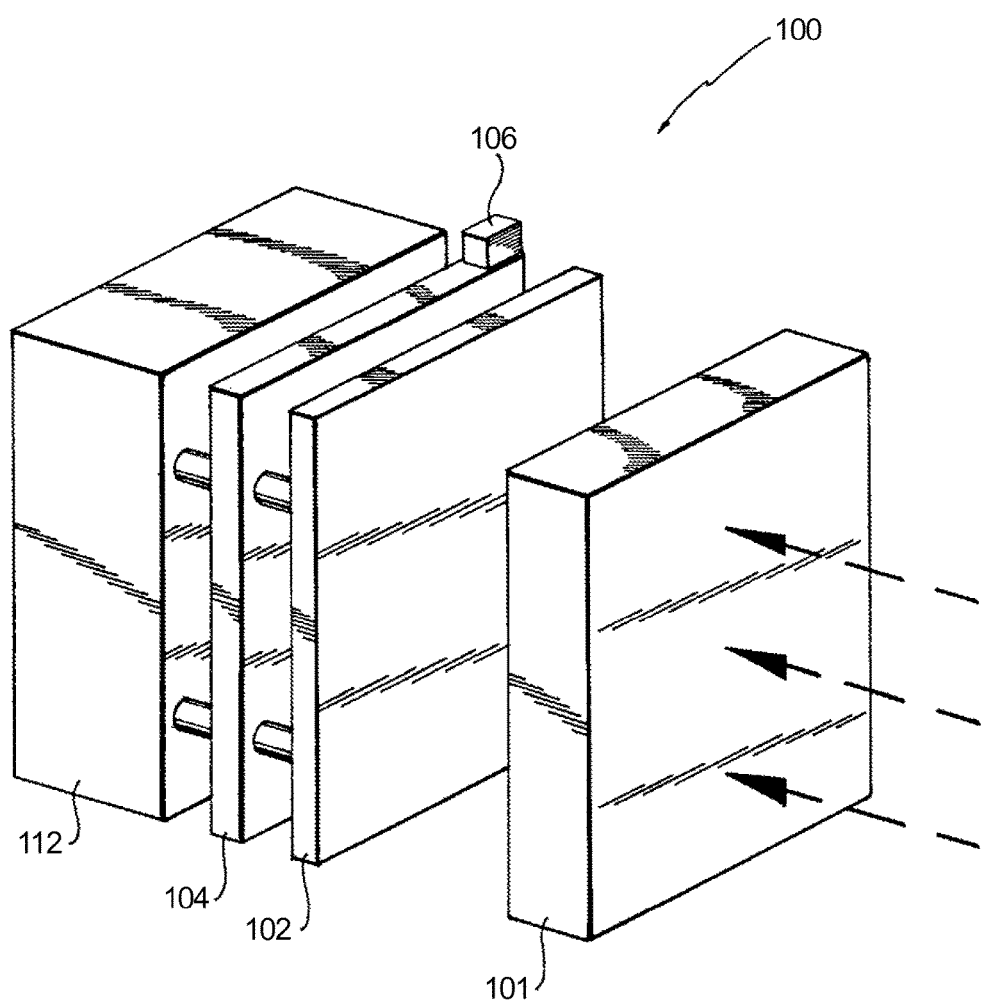
FIG. 1 is a schematic view of an exemplary embodiment of an imaging system constructed in accordance with the present disclosure, showing the focal plane array (FPA)

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems in accordance with the disclosure, or aspects thereof, are provided in FIG. 2, as will be described. The systems and methods described herein can be used for accurate imaging using non-temperature controlled focal plane arrays.

Imaging system 100 includes a focal plane array (FPA) 102, and lens optics 101 for focusing images on FPA 102, as indicated by the three large arrows in FIG. 1. A Read-Out Integrated Circuit (ROIC) 104 is operatively connected to the array of sensor 102 to condition electrical signals from the array for imaging. A temperature sensor 106 is operatively connected to ROIC 104. As the FPA 102 and ROIC 104 are in relative temperature equilibrium, temperature sensor 106 provides sufficient temperature readings to accurately represent the temperature of FPA 102. A module 112 is operatively connected to ROIC 104. The module provides electronic architecture such that signals from ROIC 104 can be conditioned for signal output, and analyzed with embedded logic such as that within a field programmable gate array (FPGA). Within module 112, the new control value Vgain, described further below, is calculated based on input from ROIC 104. The new control value is then set in ROIC 104 to achieve the desired level of gain compensation. There need be no temperature control device, such as a thermoelectric cooling device, connected for temperature control of FPA 102. FPA 102 can include a buffered current mirror pixel architecture, or any other suitable architecture. It is also contemplated that FPA 102 can include an InGaAs material for infrared imaging.

A method of normalizing FPA system gain, e.g., in imaging system 100, for varying temperature includes determining the FPA temperature, e.g., using temperature sensor 106, and calculating an FPA system gain as a function of the FPA temperature, the system gain for the FPA at a reference temperature, and empirically derived coefficients. The method also includes applying the FPA system gain at the FPA temperature to condition output of the FPA to produce temperature independent image data, which can be output, e.g., by module 112.

Applying the FPA system gain can be performed without controlling the temperature of the FPA 102. The function of the FPA temperature, system gain for the FPA at the reference temperature, and empirically derived coefficients can incorporate approximating change in system gain at the FPA temperature compared to the system gain at the reference temperature. The reference temperature can be room temperature, e.g., 20° C. or any other suitable temperature.

As a function of the FPA system gain, Vgain, and temperature, T, let Z be defined as follows:

$$Z=\log(\Delta \text{Response}/\Delta \text{Power})$$

where ΔResponse is the change in electro-optical response given change in incident optical power ΔPower. A model of the form shown below can be used to approximate the system performance wherein temperature T varies:

$$Z=p0+p1 \cdot V\text{gain}+p2 \cdot T+p3 \cdot V\text{gain} \cdot T$$

where p0, p1, p2, and p3 are constants that can be calibrated for a given system. This model can be used for calculating FPA system gain. For example, solving the equation immediately above for Vgain and substituting the value for Z obtained at a known reference temperature where Vgain is known, provides a formula for calculating the FPA system gain as a function of the FPA temperature, system gain for the FPA at a reference temperature, and empirically derived coefficients:

$$V\text{gain}(T)=[(p1+p3*T\text{ref})*V\text{gainref}+p2*(T\text{ref}-T)]/(p1+p3*T)$$

wherein Vgain is a variable control level which correlates to the FPA system gain, Vgainref is the value of the control level which sets the FPA system gain at the reference temperature (Tref), and p1, p2, and p3 are empirically derived coefficients. The units of temperature are arbitrary as long as they are consistent, and may be reported, e.g., in Kelvin, Celsius, or digital numbers such as a 12-bit integer. The coefficients p1, p2, and p3 can thus be determined to allow the formula to work on any temperature scale.

Figure 2:
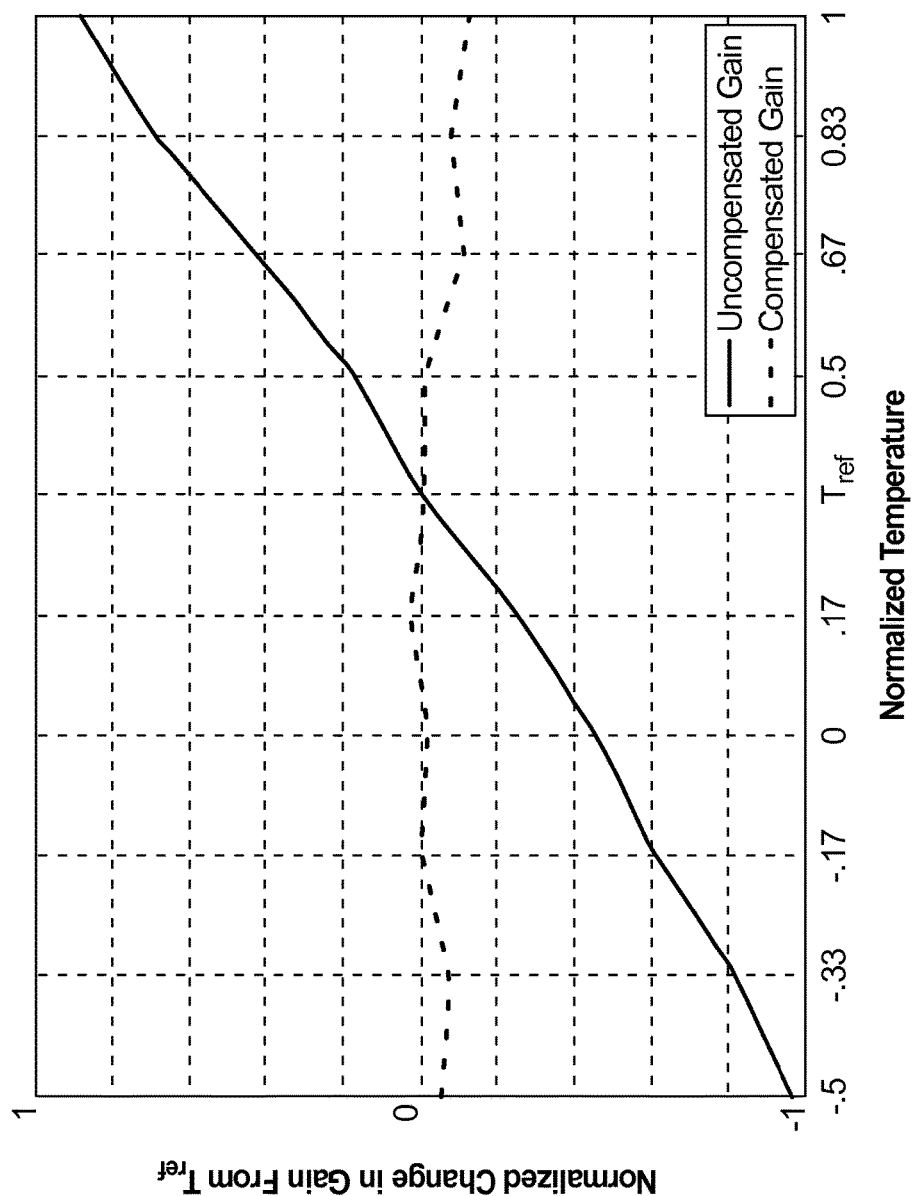
FIG. 2 is a graphs for comparing system gain in non-temperature controlled FPAs over a range of temperatures with and without compensation in accordance with embodiments in the present disclosure.

With reference now to FIG. 2, two plots are shown for system gain in a non-temperature controlled FPA. One plot is for uncompensated gain, and one is for compensated gain, and each is on the same normalized scale for comparison. The vertical scale is normalized change in system gain from the system gain at Tref. The horizontal scale is normalized temperature, and Tref is identified on the horizontal axis. The plot for uncompensated gain varies considerably as a function of temperature. By contrast, the plot for compensated gain shows that when system gain is temperature compensated as disclosed herein, the system gain can remain substantially constant over a range of temperatures. This demonstrates that the systems and methods disclosed herein provide for substantially constant system gain for non-temperature controlled FPAs over a range of temperatures.

Those skilled in the art will readily appreciate that the methods described herein can be implemented using machine readable instructions to carry out the operations described herein, e.g., executed in a module for executing machine readable instructions such as module 112 supporting imaging system 100.

Potential advantages of utilizing systems and methods as disclosed herein include eliminating hardware for temperature control, such as thermoelectric cooling devices, from imaging systems. It is also contemplated that hybrid systems can be used, wherein temperature control only partially controls temperature of the FPA, in which case any remaining FPA temperature variation can be system-gain-corrected using techniques as disclosed herein. Reducing or eliminating temperature control devices can remove a major contributor to power consumption and hardware size. It is also contemplated that if non-uniformity corrections are made for temperature variation in non-temperature controlled (or partially non-temperature controlled) imaging systems, the systems and methods disclosed herein can advantageously reduce the digital footprint of such non-uniformity corrections.

The methods and systems of the present disclosure, as described above and shown in the drawings, provide for imaging systems with superior properties including reducing or eliminating the need for temperature control, while providing accurate imaging data over a range of ambient temperatures. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of normalizing FPA system gain for varying temperature comprising:
   determining an FPA temperature;
   calculating an FPA system gain as a function of the FPA temperature, system gain for the FPA at a reference temperature, and empirically derived coefficients; and
   applying the FPA system gain at the FPA temperature to condition output of the FPA to produce temperature independent image data, wherein calculating the FPA system gain as a function of the FPA temperature, system gain for the FPA at a reference temperature, and empirically derived coefficients is governed by $$V\text{gain}(T)=[(p1+p3*T\text{ref})*V\text{gainref}+p2*(T\text{ref}-T)]/(p1+p3*T)$$

wherein Vgain is a variable control level which correlates to the FPA system gain, Vgainref is the value of the control level which sets the FPA system gain at the reference temperature (Tref), and p1, p2, and p3 are empirically derived coefficients.

2. The method as recited in claim 1, wherein applying the FPA system gain is performed without controlling the temperature of the FPA.

3. The method as recited in claim 1, where the function of the FPA temperature, system gain for the FPA at the reference temperature, and empirically derived coefficients incorporates approximating change in system gain at the FPA temperature compared to the system gain at the reference temperature.

4. The method as recited in claim 1, wherein the FPA includes a buffered current mirror pixel architecture.

5. The method as recited in claim 1, wherein the FPA includes an InGaAs material for infrared imaging.

6. The method as recited in claim 1, wherein the reference temperature is room temperature.

7. The system as recited in claim 1, wherein the reference temperature is room temperature.

8. An imaging system comprising:
a focal plane array (FPA);
a temperature sensor operatively connected to measure temperature of the FPA; and
a module operatively connected to the FPA and temperature sensor to calculate FPA system gain for the FPA as a function of the FPA temperature, system gain for the FPA at a reference temperature, and empirically derived coefficients, and to apply the FPA system gain to condition output of the FPA to produce temperature independent image data, wherein the module is configured to calculate the FPA system gain as a function of the FPA temperature, system gain for the FPA at a reference temperature, and empirically derived coefficients as governed by $$Vgain(T)=[(p1+p3*Tref)*Vgainref+p2*(Tref-T)]/(p1+p3*T)$$

wherein Vgain is a variable control level which correlates to the FPA system gain, Vgainref is the value of the control level which sets the FPA system gain at the reference temperature (Tref), and p1, p2, and p3 are empirically derived coefficients.

9. The system as recited in claim 8, wherein there is no thermoelectric cooling device connected for temperature control of the FPA.

10. The system as recited in claim 9, wherein there is no temperature control device connected for temperature control of the FPA.

11. The system as recited in claim 8, where the function of the FPA temperature, system gain for the FPA at the reference temperature, and empirically derived coefficients incorporates approximating change in system gain at the FPA temperature compared to the system gain at the reference temperature.

12. The system as recited in claim 8, wherein the FPA includes a buffered current mirror pixel architecture.

13. The system as recited in claim 8, wherein the FPA includes an InGaAs material for infrared imaging.

* * * * *